(12) United States Patent
Iwasaki (10) Patent No.: US 11,025,143 B2
(45) Date of Patent: Jun. 1, 2021

(54) STATOR MANUFACTURING METHOD, STATOR, AND MOTOR

(71) Applicant: MABUCHI MOTOR CO., LTD., Chiba (JP)

(72) Inventor: Yuya Iwasaki, Chiba (JP)

(73) Assignee: MABUCHI MOTOR CO., LTD., Chiba (JP)

( * ) Notice: Subject to any disclaimer, the term of this patent is extended or adjusted under 35 U.S.C. 154(b) by 304 days.

(21) Appl. No.: 16/105,971

(22) Filed: Aug. 21, 2018

(65) Prior Publication Data

US 2019/0068034 A1 Feb. 28, 2019

(30) Foreign Application Priority Data

Aug. 22, 2017 (JP) .............. JP2017-159091
Aug. 6, 2018 (JP) .............. JP2018-147981

(51) Int. Cl.
| | |
|---|---|
| *H02K 15/095* | (2006.01) |
| *H02K 1/14* | (2006.01) |
| *H02K 3/18* | (2006.01) |
| *H02K 3/28* | (2006.01) |
| *H02K 3/32* | (2006.01) |
| *H02K 15/02* | (2006.01) |
| *H02K 15/10* | (2006.01) |
| *H02K 3/52* | (2006.01) |

(52) U.S. Cl.
CPC ........... *H02K 15/095* (2013.01); *H02K 1/146* (2013.01); *H02K 3/18* (2013.01); *H02K 3/28* (2013.01); *H02K 3/325* (2013.01); *H02K 3/522* (2013.01); *H02K 15/022* (2013.01); *H02K 15/10* (2013.01); *H02K 2213/03* (2013.01)

(58) Field of Classification Search
CPC .... H02K 15/022; H02K 15/095; H02K 15/10; H02K 1/146; H02K 2213/03; H02K 3/18; H02K 3/28; H02K 3/325; H02K 3/522
USPC .......................................... 310/208
See application file for complete search history.

(56) References Cited

U.S. PATENT DOCUMENTS

| | | | | |
|---|---|---|---|---|
| 7,166,949 | B2 * | 1/2007 | Okada ............... | H02K 3/522 |
| | | | | 310/194 |
| 9,209,658 | B2 * | 12/2015 | Haga ................. | H02K 3/18 |
| 10,498,185 | B2 * | 12/2019 | Asahi ................ | H02K 3/522 |
| 2004/0263015 | A1 * | 12/2004 | Okada ............... | H02K 3/522 |
| | | | | 310/194 |

(Continued)

FOREIGN PATENT DOCUMENTS

JP    2016-174470 A    9/2016

*Primary Examiner* — Alex W Mok
(74) *Attorney, Agent, or Firm* — Hauptman Ham, LLP (57) ABSTRACT

A method includes forming a first wire layer wound on the insulator and a second wire layer wound on the first wire layer by winding the wire on the insulator. If (L1+D)tan(θ/2)cos(θ/2)−A cos(θ/2)>D, the first wire layer is formed by winding the wire on an upper surface of the step portion, where A is B/2+(1+√3/2)D, B is a width of the insulator, D is a wire diameter, θ is an angle formed by the central axes of circumferentially adjacent teeth, L1 is a distance from a central axis of the stator to an end of the upper surface of the step portion on the inner side in the radial direction, and L2 is a distance from the central axis of the stator to an end of the upper surface of the step portion on the outer side in the radial direction.

14 Claims, 7 Drawing Sheets

(56) References Cited

U.S. PATENT DOCUMENTS

| | | | |
|---|---|---|---|
| 2005/0212644 A1* | 9/2005 | Yoshimori | H01F 5/02 336/224 |
| 2007/0170805 A1* | 7/2007 | Tamaoka | H02K 15/022 310/216.054 |
| 2011/0156523 A1* | 6/2011 | Kljaic | H02K 3/18 310/208 |
| 2012/0025662 A1* | 2/2012 | Takahashi | H02K 1/148 310/215 |
| 2012/0313477 A1* | 12/2012 | Haga | H02K 3/522 310/208 |
| 2013/0106232 A1* | 5/2013 | Kobayashi | H02K 15/095 310/208 |
| 2016/0352176 A1* | 12/2016 | Tokizaki | H02K 7/1166 |
| 2017/0141634 A1* | 5/2017 | Honda | H02K 1/146 |

* cited by examiner

STATOR MANUFACTURING METHOD, STATOR, AND MOTOR

RELATED APPLICATIONS

The present application claims priority to Japanese Application No. 2017-159091 filed Aug. 22, 2017 and Japanese Application No. 2018-147981 filed Aug. 6, 2018, the disclosures of which are hereby incorporated by reference herein in their entirety.

BACKGROUND

1. Technical Field

The present invention relates to a stator manufacturing method, a motor manufacturing method, a winding method, a stator, and a motor.

2. Description of the Related Art

Motors have been used as a drive source for various devices and products. For example, motors are being used as power sources in moving bodies such as automobiles and electric vehicles, including electric power-assisted bicycles and electric wheelchairs. In such apparatuses, high-output motors may be required.

In an inner-rotor brushless motor, in order to increase motor output, it may be desirable to increase the number of turns of windings on teeth. When the number of turns is increased, the resistance between terminals increases, so that it is preferable to use a wire with a large wire diameter. The interval of adjacent teeth becomes narrower at the distal end of the teeth. Accordingly, when a wire with a large wire diameter is used, it may become necessary, in order to suppress interference between the windings on adjacent teeth and the nozzle of a winding machine, to stop winding for the first layer in front of the blade tip of the teeth and to start winding for the second layer. When a wire with a large wire diameter is used, the wire in the first layer may be displaced toward the blade tip due to high tension applied thereto.

A technique is known whereby an insulator is provided with a step to reduce the tightening of a coil winding (see JP-A-2016-174470, for example).

SUMMARY

According to the technique described in JP-A-2016-174470, for example, when a wire with a large wire diameter is used, it may be difficult to suppress the interference between the nozzle of the winding machine and the winding. In addition, when a wire with a large wire diameter is used, the wire in the first layer is liable to be displaced, as described above. In this case, if the insulator were to be provided with a groove for engaging the wire, it would become necessary to prepare insulators for each different wire diameter.

The present invention has been made in view of the above circumstance, and an object of the present invention is to provide a stator with which the interference between the nozzle of a winding machine and a winding can be suppressed without preparing insulators for wires with different wire diameters separately.

In order to solve the problem, a first aspect of the present invention provides a method for manufacturing a stator which includes a stator core having a plurality of teeth arranged in a circumferential direction and extending inward in a radial direction, and a wire wound on an insulator mounted to the plurality of teeth. The insulator includes, on a winding surface thereof on which the wire is wound and at a distal end in the direction of extension of the teeth, a step portion protruding in an axis direction of the stator. The method includes a step of forming a first wire layer wound on the insulator and a second wire layer wound on the first wire layer by winding the wire on the insulator. The step of forming the first wire layer and the second wire layer includes: if $(L1+D)\tan(\theta/2) \times \cos(\theta/2) - A\cos(\theta/2) > D$, forming the first wire layer by winding the wire on an upper surface of the step portion; and, if $(L1+D)\tan(\theta/2) \times \cos(\theta/2) - A\cos(\theta/2) < D$ and $(L2+D)\tan(\theta/2) \times \cos(\theta/2) - A\cos(\theta/2) > D$, forming the first wire layer without winding the wire on the upper surface of the step portion, where: A is $B/2 + (1+\sqrt{3}/2)D$; B is a width of the insulator in a plane orthogonal to the axis direction; D is a diameter of the wire; $\theta$ is an angle formed by central axes of teeth that are adjacent in the circumferential direction among the plurality of teeth; L1 is a distance from a central axis of the stator to an end of the upper surface of the step portion on the inner side in the radial direction; and L2 is a distance from the central axis of the stator to an end of the upper surface of the step portion on the outer side in the radial direction.

According to this aspect, it can be appropriately determined whether there is the possibility of interference between the nozzle of the winding machine and the wire layers in the vicinity of the distal end of the teeth. Accordingly, it can be appropriately determined whether the wire is to be wound on the step in accordance with the wire diameter so that the nozzle of the winding machine and the wire layers do not interfere with each other. For example, when a wire with a large wire diameter is wound, the interference between the nozzle and the winding can be suppressed by winding the second wire layer without winding on the step portion. On the other hand, when a wire with a small wire diameter is wound, a wire space can be maintained by forming the first wire layer by winding on the step portion. In addition, it becomes possible to eliminate the need for manufacturing insulators for respective wire diameters of the wire, and to commonly use an insulator with respect to wires with different wire diameters.

The insulator may include the step portion only on an end surface intersecting the axis direction, among a plurality of end surfaces of the insulator. Accordingly, when a wire with a small wire diameter is wound on the step, a decrease in wire space can be suppressed.

On the further condition that $D/2 \leq H$ where H is the height of the step, the first wire layer may be formed without winding the wire on the upper surface of the step portion. In this way, it becomes possible to suppress displacement of the wire forming the first wire layer when the wire is wound on the first wire layer.

A second aspect of the present invention provides a method for manufacturing a motor provided with a stator which includes a stator core having a plurality of teeth arranged in a circumferential direction and extending inward in a radial direction, and a wire wound on an insulator mounted to the plurality of teeth. The insulator includes, on a winding surface thereof on which the wire is wound and at a distal end in the direction of extension of the plurality of teeth, a step portion protruding in an axis direction of the stator. The method includes a step of forming a first wire layer wound on the insulator and a second wire layer wound on the first wire layer by winding the wire on the insulator. The step of forming the first wire layer and the second wire layer includes: if $(L1+D)\tan(\theta/2)\times\cos(\theta/2)-A\cos(\theta/2)>D$, forming the first wire layer by winding the wire on an upper surface of the step portion; and, if $(L1+D)\tan(\theta/2)\times\cos(\theta/2)-A\cos(\theta/2)<D$ and $(L2+D)\tan(\theta/2)\times\cos(\theta/2)-A\cos(\theta/2)>D$, forming the first wire layer without winding the wire on the upper surface of the step portion, where: A is $B/2+(1+\sqrt{3}/2)D$; B is a width of the insulator in a plane orthogonal to the axis direction; D is a diameter of the wire; $\theta$ is an angle formed by central axes of teeth that are adjacent in the circumferential direction among the plurality of teeth; L1 is a distance from a central axis of the stator to an end of the upper surface of the step portion on the inner side in the radial direction; and L2 is a distance from the central axis of the stator to an end of the upper surface of the step portion on the outer side in the radial direction. According to this aspect, it is possible to provide a motor having effects similar to those described with reference to the above-described stator manufacturing method.

The insulator may not include, on the winding surface and at an end on the opposite side from the distal end in the direction of extension of the teeth, a step portion protruding in the axis direction of the stator. By not providing a step portion at the end on the opposite side from the distal end, the wire space factor can be increased.

A third aspect of the present invention provides a winding method of winding a wire on an insulator mounted to a plurality of teeth of a stator core included in a stator. The teeth are arranged in a circumferential direction and extend inward in a radial direction. The insulator includes, on a winding surface thereof on which the wire is wound and at a distal end in the direction of extension of the teeth, a step portion protruding in an axis direction of the stator. The method includes: a step of determining whether the wire is to be wound on an upper surface of the step portion; if it is determined that the wire is to be wound on the upper surface of the step portion, a step of winding the wire on the winding surface including the upper surface of the step portion, and winding the wire on an obtained wire layer; and if it is determined that the wire is not to be wound on the upper surface of the step portion, a step of winding the wire on the winding surface without winding the wire on the upper surface of the step portion. The step of determining whether the wire is to be wound on the upper surface of the step portion includes: if $(L1+D)\tan(\theta/2)\times\cos(\theta/2)-A\cos(\theta/2)>D$, determining that the wire is to be wound on the upper surface of the step portion; and if $(L1+D)\tan(\theta/2)\times\cos(\theta/2)-A\cos(\theta/2)<D$ and $(L2+D)\tan(\theta/2)\times\cos(\theta/2)-A\cos(\theta/2)>D$, determining that the wire is not to be wound on the upper surface of the step portion, where: A is $B/2+(1+\sqrt{3}/2)D$; B is a width of the insulator in a plane orthogonal to the axis direction; D is a diameter of the wire; $\theta$ is an angle formed by central axes of teeth adjacent in the circumferential direction; L1 is a distance from a central axis of the stator to an end of the upper surface of the step portion on the inner side in the radial direction; and L2 is a distance from the central axis of the stator to an end of the upper surface of the step portion on the outer side in the radial direction. According to this aspect too, effects similar to those described with reference to the stator manufacturing method can be obtained.

A fourth aspect of the present invention provides a stator including: a stator core including a plurality of teeth arranged in a circumferential direction and extending inward in a radial direction; an insulator mounted to the plurality of teeth; a first wire layer of a wire wound on the insulator; and a second wire layer of the wire wound on the first wire layer. The insulator includes, on a winding surface thereof on which the wire is wound and at a distal end in the direction of extension of the teeth, a step portion protruding in an axis direction of the stator. The first wire layer is formed of the wire wound on the winding surface including an upper surface of the step portion, and $(L1+D)\tan(\theta/2)\times\cos(\theta/2)-A\cos(\theta/2)>D$ is satisfied, where: A is $B/2+(1+\sqrt{3}/2)D$; B is a width of the insulator in a plane orthogonal to the axis direction; D is a diameter of the wire; $\theta$ is an angle formed by central axes of teeth that are adjacent in the circumferential direction among the plurality of teeth; L1 is a distance from a central axis of the stator to an end of the upper surface of the step portion on the inner side in the radial direction; and L2 is a distance from the central axis of the stator to an end of the upper surface of the step portion on the outer side in the radial direction. According also to this aspect, it is possible to provide a stator having effects similar to those described with reference to the above-described stator manufacturing method.

A fifth aspect of the present invention provides a stator including: a stator core including a plurality of teeth arranged in a circumferential direction and extending inward in a radial direction; an insulator mounted to the teeth; a first wire layer of a wire wound on the insulator; and a second wire layer of the wire wound on the first wire layer. The insulator includes, on a winding surface thereof on which the wire is wound and at a distal end in the direction of extension of the plurality of teeth, a step portion protruding in an axis direction of the stator. The first wire layer is formed on the winding surface except for an upper surface of the step portion, and $(L1+D)\tan(\theta/2)\times\cos(\theta/2)-A\cos(\theta/2)<D$ and $(L2+D)\tan(\theta/2)\times\cos(\theta/2)-A\cos(\theta/2)>D$ are satisfied, where: A is $B/2+(1+\sqrt{3}/2)D$; B is a width of the insulator in a plane orthogonal to the axis direction; D is a diameter of the wire; $\theta$ is an angle formed by central axes of teeth that are adjacent in the circumferential direction among the plurality of teeth; L1 is a distance from a central axis of the stator to an end of the upper surface of the step portion on the inner side in the radial direction; and L2 is a distance from the central axis of the stator to an end of the upper surface of the step portion on the outer side in the radial direction. According also to this aspect, it is possible to obtain effects similar to those described with reference to the above-described stator manufacturing method.

The stator may be such that $D/2 \leq H$, where H is the height of the step portion. In this way, it is possible to suppress the displacement of the wire forming the first wire layer when the wire is wound on the first wire layer.

In the stator, the insulator may not include, on the winding surface and at an end on the opposite side from the distal end in the direction of extension of the teeth, a step portion protruding in the axis direction of the stator. In this way, the wire space can be increased.

A sixth aspect of the present invention provides a motor provided with the stator. According also to this aspect, it is possible to provide a motor having effects similar to those described with reference to the above-described stator manufacturing method.

A seventh aspect of the present invention provides a method for manufacturing a stator provided with a stator core including a plurality of teeth arranged in a circumferential direction and extending inward in a radial direction, and a wire wound on an insulator mounted to the plurality of teeth. The insulator includes, on a winding surface thereof on which the wire is wound and at a distal end in the direction of extension of the plurality of teeth, a step portion protruding in an axis direction of the stator. The method includes a step of forming a first wire layer wound on the insulator and a second wire layer wound on the first wire layer by winding the wire on the insulator. The step of forming the first wire layer and the second wire layer includes: if, in a state in which the second wire layer is formed on the first wire layer wound to an end of an upper surface of the step portion on the inner side in the radial direction, ½ of the shortest distance between the second wire layers on the insulator mounted to teeth that are adjacent to each other in the circumferential direction among the plurality of teeth is greater than the diameter of the wire, forming the first wire layer by winding the wire on the upper surface of the step portion; and if, in a state in which the second wire layer is formed on the first wire layer wound to the end of the upper surface of the step portion on the inner side in the radial direction, ½ of the shortest distance between the second wire layers on the insulator mounted to the teeth that are adjacent to each other in the circumferential direction among the plurality of teeth is smaller than the diameter of the wire, and if, in a state in which the second wire layer is formed on the first wire layer wound until the wire contacts a step surface at an end of the step portion on the outer side in the radial direction, ½ of the shortest distance between the second wire layers on the insulator mounted to the teeth that are adjacent to each other in the circumferential direction among the plurality of teeth is greater than the diameter of the wire, forming the first wire layer without winding the wire on the upper surface of the step portion.

According to this aspect, it is possible to provide a stator having effects similar to those described with reference to the above-described stator manufacturing method.

Generally, if the shortest distance between the wire layers on adjacent teeth is smaller than twice the diameter of the wire, the nozzle of the winding machine and the wire layers interfere with each other. The interference between the nozzle and the wire layers can be avoided by displacing the position of the inner end of the wire layer in the radial direction toward the outer side in the radial direction. However, when the diameter of the wire used is changed, it becomes necessary to change the shortest distance between the wire layers on the adjacent teeth so as to avoid the interference between the nozzle and the wire layers. As a result, it becomes necessary to design insulators suitable for each of expected wire diameters. Meanwhile, in order to accommodate wires with different diameters with a single type of insulator, it is necessary to design the insulator such that the interference with the nozzle can be avoided even when a maximum expected diameter is used. In this case, however, the space factor decreases when a wire with a diameter smaller than the maximum diameter is used.

An object of the above-described aspects is to design a versatile insulator with which a decrease in space factor can be suppressed even when wires with different diameters are used, and to make it possible, if the shortest distance between the wire layers on adjacent teeth becomes smaller than twice the diameter of the wire when the wire is wound to the inner end in the radial direction, to wind the wire using the insulator so that the shortest distance becomes greater than twice the diameter of the wire.

Accordingly, the insulator is provided with a step portion which makes it possible, if the shortest distance between the wire layers on the adjacent teeth becomes smaller than twice the wire diameter of the wire when the wire is wound to the inner end in the radial direction of the teeth, to form a wire layer without winding the wire to the position at which the shortest distance from the inner end in the radial direction becomes greater than twice the diameter of the wire. That is, the insulator is provided with a step portion which makes it possible to displace the position of the inner end in the radial direction of the wire layer toward the outer side in the radial direction to such an extent that the nozzle of the winding machine does not interfere with the wire layer. For example, the length of the step portion in the radial direction is designed such that, when a wire with an expected maximum diameter is wound until the wire contacts the step surface of the step portion at the outer end in the radial direction, the shortest distance between the wire layers becomes greater than twice the diameter of the wire. On the other hand, the step portion, if the shortest distance between the wire layers is greater than twice the diameter of the wire, makes it possible to form a wire layer to the inner end in the radial direction by winding the wire on the step portion. In this way, it becomes possible to suppress a decrease in space factor.

The Summary is not a list of all of the features of the present invention. A sub-combination of a group of features of the present invention may constitute an invention.

DESCRIPTION OF THE EMBODIMENTS

In the following, the present invention will be described with reference to embodiments. The embodiments, however, should not to be interpreted as limiting the invention defined in the claims. It should also be noted that not all of the combinations of the features described in the embodiments are required for the solution provided by the invention.

Figure 1:
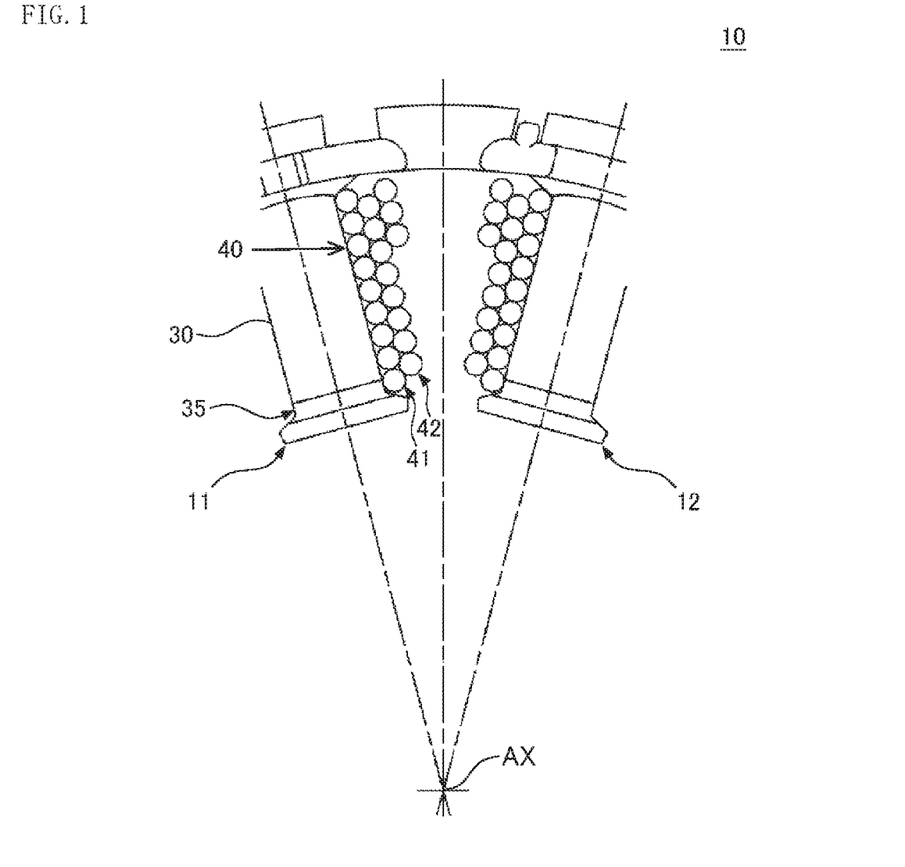
FIG. 1 is a front view illustrating a part of a stator 10 included in a motor according to an embodiment.

FIG. 1 is a front view illustrating a part of a stator 10 included in a motor according to an embodiment. The motor of the present embodiment is a brushless motor. Specifically, the motor of the present embodiment is an inner-rotor brushless motor. The stator 10 is provided with a plurality of wire winding portions including a wire winding portion 11 and a wire winding portion 12, and a winding 40. The winding 40 includes a U-phase winding, a V-phase winding, and a W-phase winding.

The winding 40 is formed by winding a wire on an insulator 30 mounted to a stator core. On the insulator 30, two or more wire layers are formed. Specifically, a first wire layer 41 is a layer wound on the insulator 30. That is, the first wire layer 41 is the first layer. A second wire layer 42 is a layer wound on the first wire layer 41. That is, the second wire layer 42 is the second layer.

Figure 2:
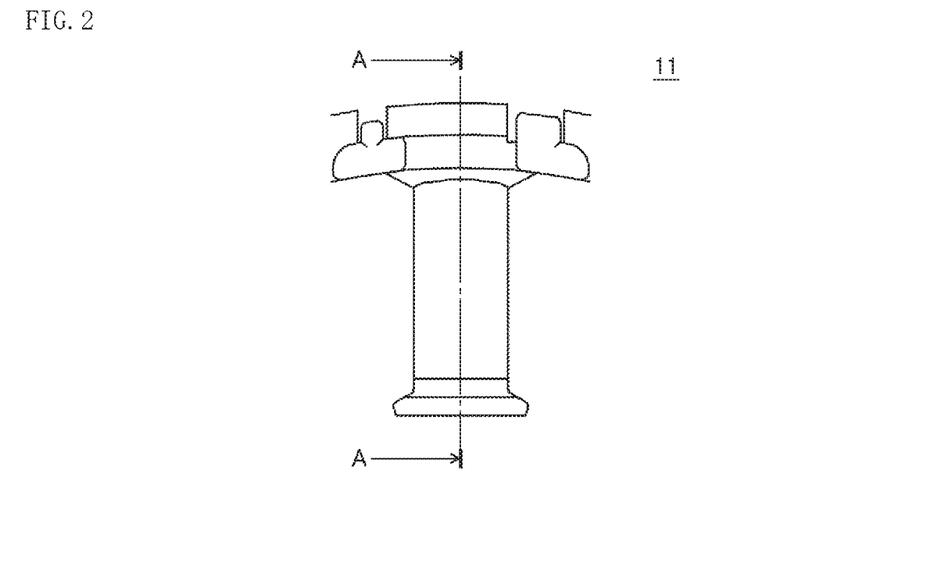
FIG. 2 is a front view of a wire winding portion 11 provided with an insulator.
Figure 3:
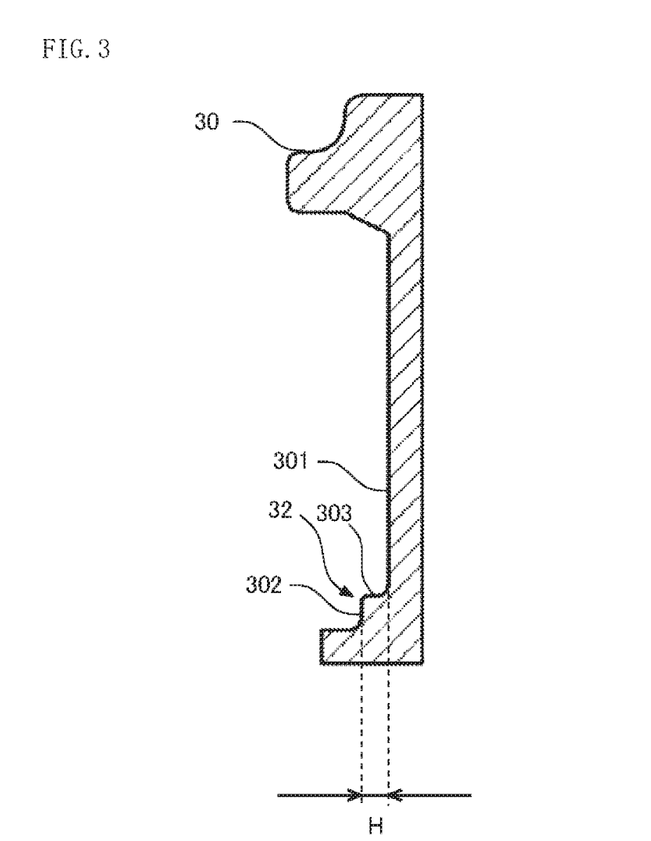
FIG. 3 is an enlarged view of a part of an A-A cross section of FIG. 2.

FIG. 2 illustrates a front view of the wire winding portion 11. The wire winding portion 11 is formed of a tooth of the stator core, and a part of the insulator 30 that covers the tooth. FIG. 3 is an enlarged view of a part of an A-A cross section of FIG. 2. Specifically, FIG. 3 illustrates an A-A cross section of the insulator 30.

The stator 10 is a cylindrical member. In the stator 10, a rotor is disposed. The rotor includes a rotating shaft serving an output shaft of the motor. In the description of the present embodiment, the direction of a central axis AX of the motor will be referred to as an "axis direction", unless otherwise noted. The axis direction corresponds to a thrust direction. The central axis of the motor corresponds to a central axis of the stator 10. The centers of a "circumferential direction" and a "radial direction" correspond to the central axis of the motor.

The stator core includes a ring-shaped yoke and a plurality of teeth. The plurality of teeth of the stator core are provided on the inner peripheral side of the yoke, arranged in the circumferential direction, and extend inward in the radial direction. Each of the plurality of teeth extends toward the center of the stator 10. The position of the center of the stator 10 is the position of the central axis of the motor. Specifically, in the motor, the rotor is provided such that the central axis of the rotating shaft corresponds to the center of the stator 10.

As illustrated in FIG. 3, the insulator 30 has a step portion 32 with a height H. The step portion 32 is formed at a distal end of the teeth in the direction of extension thereof, so as to protrude in the axis direction of the stator 10. The step portion 32 is formed of a lower surface 301 of the step portion 32, an upper surface 302 of the step portion 32, and a step surface 303. The lower surface 301 of the step portion 32 and the upper surface 302 of the step portion 32 are winding surfaces of the insulator 30 on which a wire can be wound. The step portion 32 is formed in the axis direction. For example, the step portion 32 is not provided on a side surface 35 parallel to the axis direction. For example, the step portion 32 is not provided on a side surface 35 opposing an adjacent wire winding portion. Specifically, at the side surface 35, the lower surface 301 of the step portion 32 and the upper surface 302 of the step portion 32 have the same height. Thus, the insulator 30 may have the step portion 32 only on an end surface, among a plurality of end surfaces of the insulator 30, which intersects the axis direction.

In the present embodiment, when a wire having a diameter D which is more than a predetermined threshold value is wound, the wire is wound to the step surface 303 to form the first wire layer, and then the winding turns back to wind the second wire layer. In this way, it becomes possible to suppress the nozzle of the winding machine from interfering with the winding layers at the distal end of the wire winding portion 11 on the inner side in the radial direction, and to suppress the displacement of the wire by means of the step surface 303. On the other hand, when a wire having a diameter D less than the predetermined threshold value is used, the wire is wound across the step surface 303 and onto the upper surface 302 of the step portion 32, and then the winding turns back to wind the second wire layer.

The insulator 30 does not have, on the lower surface 301 serving as the winding surface, a step portion protruding in the axis direction of the stator 10 at the end on the opposite side from the distal end in the direction of extension of the teeth. For example, as illustrated in FIG. 3, the insulator has an inclined surface protruding from the end on the opposite side and inclining toward the lower surface 301. The only requirement being the absence of a step portion, the end on the opposite side is not limited to an inclined surface and may be formed of a single flat surface, for example. That is, the insulator 30 has the step portion 32 only at the distal end in the direction of extension of the teeth. In this way, the wire space factor can be increased.

Figure 4:
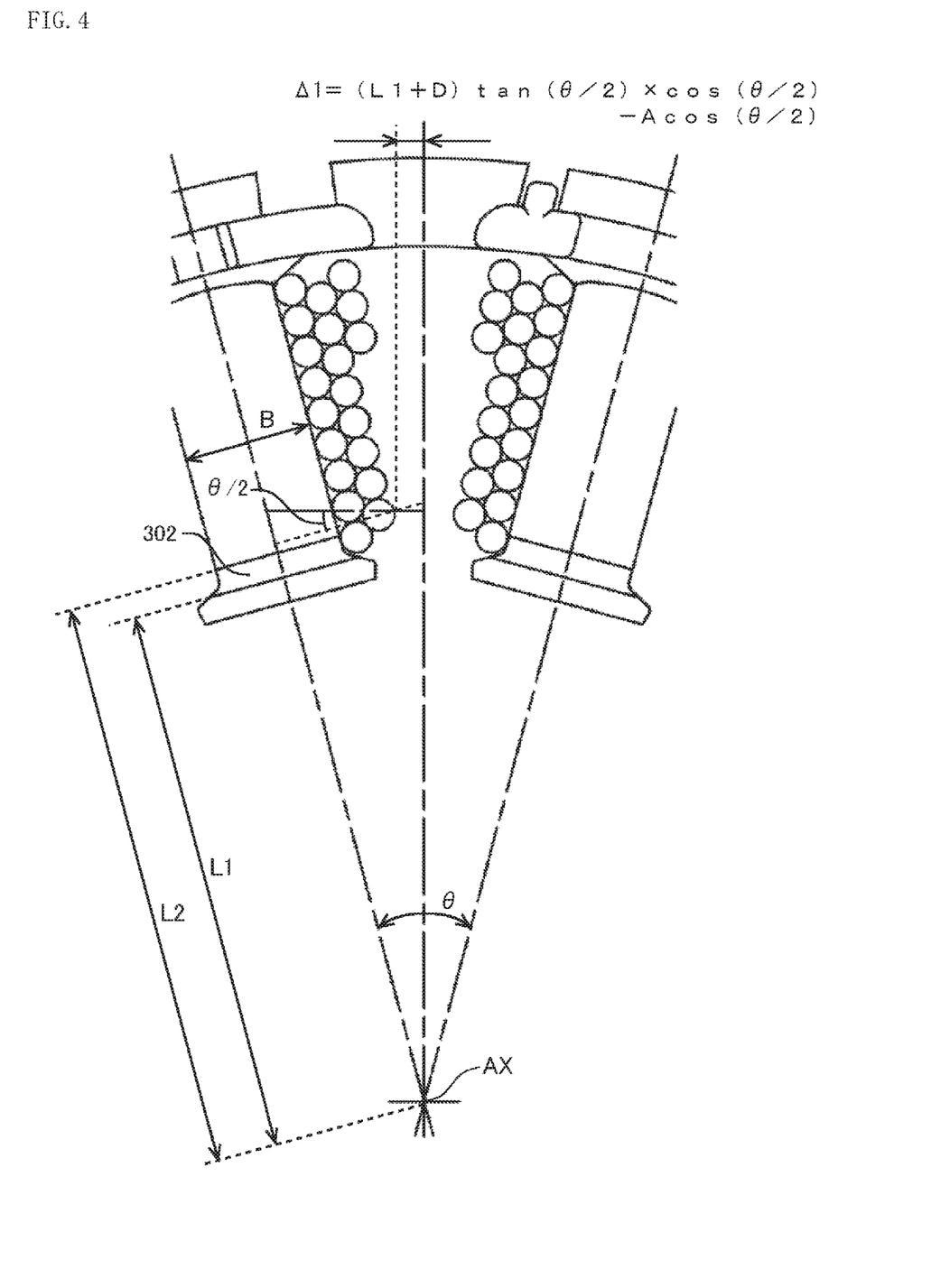
FIG. 4 is a diagram for explaining a determination condition for determining whether a wire is to be wound on an upper surface 302 of a step portion 32.

FIG. 4 is a diagram for explaining determination conditions for determining whether a wire should be wound on the upper surface 302 of the step portion 32. In the present embodiment, it is determined whether a wire is to be wound on the upper surface 302 of the step portion 32 on the basis of a distance A between windings that are adjacent in the circumferential direction. For example, it is determined that a wire is to be wound on the upper surface 302 of the step portion 32 of the wire winding portion on condition that the distance $\Delta 1$ after the wire has been wound on the upper surface 302 of the step portion 32 and turns back to form the second layer is greater than a predetermined value required for inserting the nozzle of the winding machine.

Specifically, the first wire layer 41 is formed by winding a wire on the upper surface of the step portion 32 if $(L1+D)\tan(\theta/2) \times \cos(\theta/2) - A\cos(\theta/2) > D$  (condition expression 1)

is satisfied.
On the other hand, if $(L1+D)\tan(\theta/2) \times \cos(\theta/2) - A\cos(\theta/2) < D$  (condition expression 2) and $(L2+D)\tan(\theta/2) \times \cos(\theta/2) - A\cos(\theta/2) > D$  (condition expression 3)

are satisfied, the first wire layer 41 is formed without winding the wire on the upper surface 302 of the step portion 32. In the expressions, A is $B/2+(1+\sqrt{3}/2)D$, where B is the width of the insulator 30 in a plane orthogonal to the axis direction and D is the diameter of the wire; $\theta$ is the angle formed by central axes of teeth that are adjacent in the circumferential direction among the plurality of teeth; L1 is the distance from the central axis AX of the stator to the end of the upper surface 302 of the step portion 32 on the inner side in the radial direction; and L2 is the distance from the central axis AX of the stator to the end of the upper surface 302 of the step portion 32 on the outer side in the radial direction.

If, in addition to condition expression 2 and condition expression 3, $D/2 \leq H$ is further satisfied, the first wire layer 41 may be formed without winding the wire on the upper surface 302 of the step portion 32. If $D/2 \leq H$ is further satisfied, it is possible to reliably suppress the displacement of the wire forming the first wire layer 41 even when the wire is wound on the first wire layer 41.

With reference to FIG. 4, the left-hand side of condition expression (1) indicates $\Delta 1$ shown in FIG. 4. In order to insert the nozzle of the winding machine, a gap of approximately 2D is required between windings. Accordingly, if condition expression 1 is satisfied, it can be determined that the nozzle can be suppressed from interfering with the wire layers even if the wire is wound onto the upper surface 302 of the step portion 32 and then turns back to form the second layer.

Similarly, if condition expression 2 and condition expression 3 are satisfied, it can be determined that the nozzle of the winding machine can be suppressed from interfering with the wire layers by winding the wire to the step surface 303, which is spaced apart from the central axis AX by L2, and then turns back without winding the wire on the upper surface 302 of the step portion 32.

Figure 5:
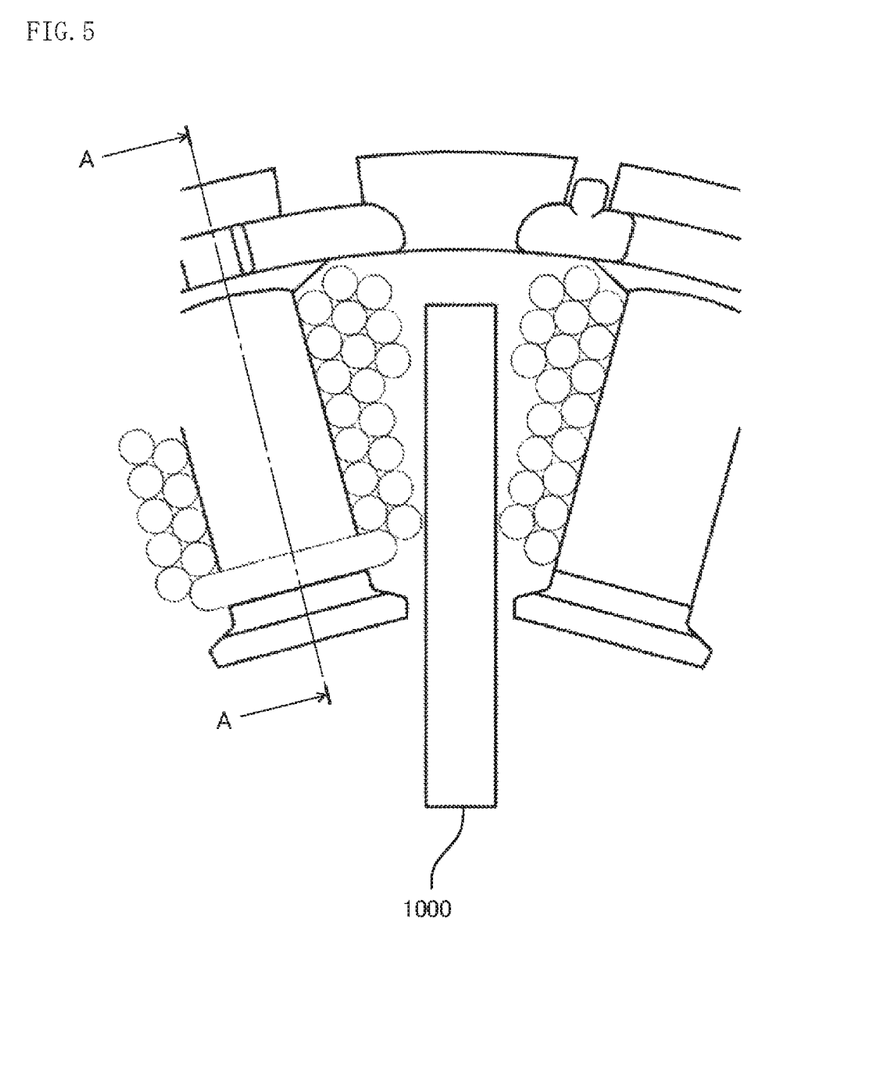
FIG. 5 schematically illustrates an example of a winding configuration in which a wire with a diameter of 1.2 is used.
Figure 6:
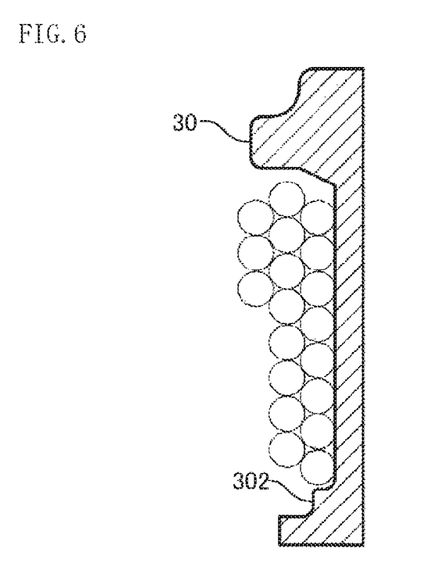
FIG. 6 illustrates an A-A cross section of FIG. 5.

FIG. 5 schematically illustrates an example of a winding configuration in which a wire of ϕ1.2 is used. FIG. 6 illustrates an A-A cross section of the insulator 30 in FIG. 5 together with wire layers. In the present example, L1 is 21.5 mm, L2 is 22.5 mm, θ is 30°, and A is 4.7295 mm. The wire of ϕ1.2 has a diameter D with the value of 1.268 mm including the thickness of wire coating. Since the left-hand side of condition expression 1 is 1.1442, condition expression 1 is not satisfied, and condition expression 2 is satisfied. Since the left-hand side of condition expression 3 is 1.40302, condition expression 3 is satisfied. Accordingly, it is determined that the wire is not to be wound on the upper surface 302 of the step portion 32. By turning back at the step surface 303 without winding the wire on the upper surface 302 of the step portion 32, the nozzle of the winding machine 1000 can be suppressed from contacting the winding, as illustrated in FIG. 5. It also becomes possible to suppress the displacement of the wire forming the first wire layer.

Figure 7:
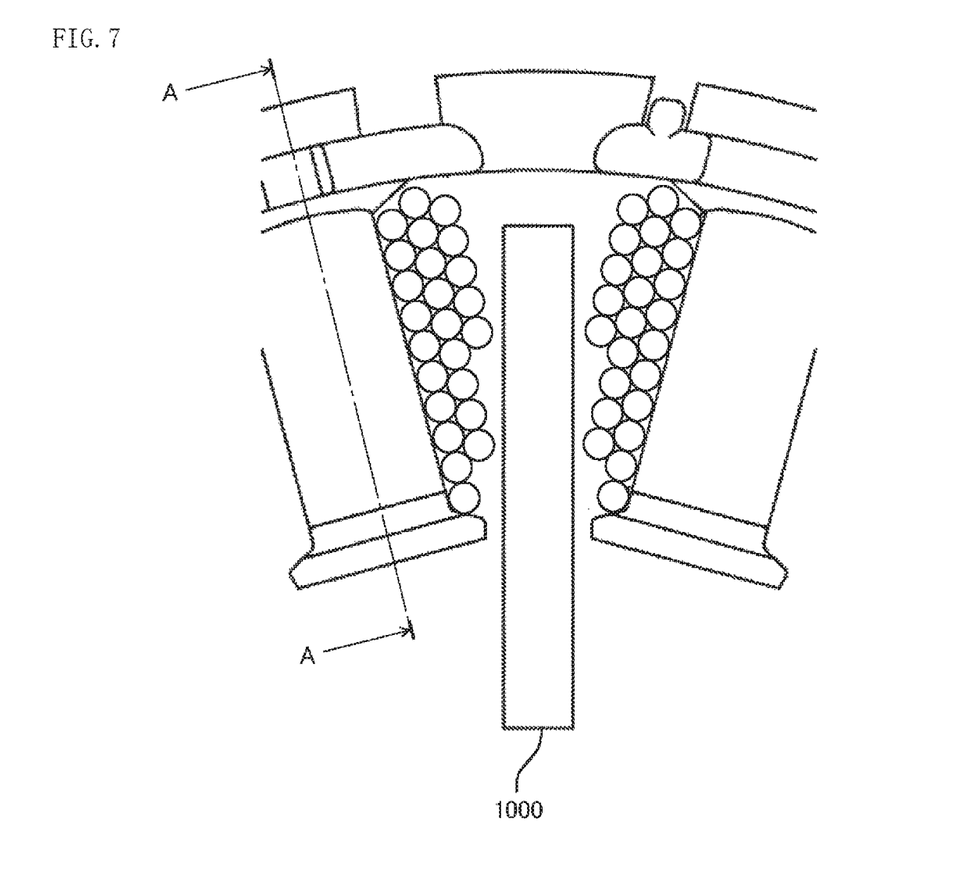
FIG. 7 schematically illustrates an example of a configuration in which a $\phi 1.1$ wire is used.
Figure 8:
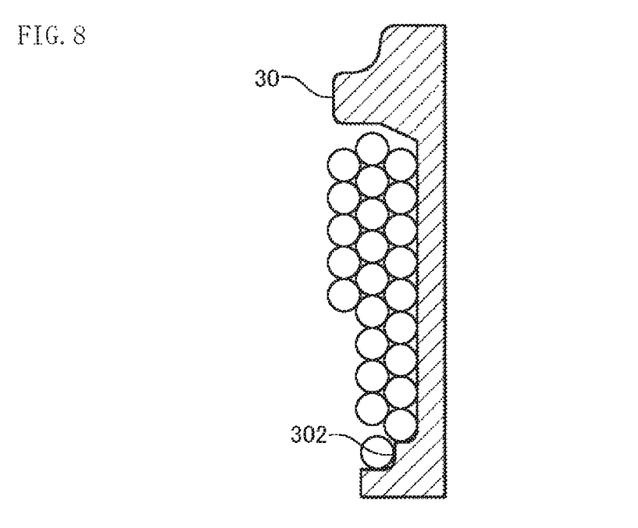
FIG. 8 illustrates a A-A cross section of FIG. 7.

FIG. 7 schematically illustrates an example of a winding configuration in which a wire of ϕ1.1 is used. FIG. 8 illustrates an A-A cross section of the insulator 30 of FIG. 7 together with wire layers. As in the example of FIG. 5, L1 is 21.5 mm, L2 is 22.5 mm, and θ is 30°; however, A is 4.7295 mm. The wire of ϕ1.1 has a diameter D of the value 1.168 including the thickness of wire coating. Since the left-hand side of condition expression 1 is 1.29856, condition expression 1 is satisfied. Accordingly, it is determined that the wire is to be wound on the upper surface 302 of the step portion 32. When the wire of ϕ1.1 is used, even if the wire is wound on the upper surface 302 of the step portion 32 and then turns back, it is possible to suppress the nozzle of the winding machine 1000 from contacting the windings, as illustrated in FIG. 7. Further, by winding the wire on the upper surface 302 of the step portion 32, the number of turns can be increased, making it possible to ensure a required number of turns even when the insulator 30 having the step portion 32 is used.

In the foregoing, the configuration in which a wire is wound on the upper surface 302 of the step portion 32 and the configuration in which a wire is not wound on the upper surface 302 of the step portion 32 have been concretely described. Specifically, as illustrated in FIG. 4, for example, it has been described that, in a cross section orthogonal to the axis direction, the first wire layer 41 and the second wire layer 42 are formed by winding the wire on the insulator 30 in a closely packed manner Specifically, the first wire layer 41 is formed by winding the wire successively so that wires contact one another in the direction of extension of the insulator 30. Further, the second wire layer 42 is formed by winding the wire for forming the second wire layer 42 in the pockets between the contacting wires. That is, the wire is wound such that an equilateral triangle with each side having a length D is formed by the respective centers of a pair of wire portions contacting one another in the first wire layer 41, and the center of the wire of the second wire layer 42 contacting the pair of wire portions. In this winding state, if condition expression 1 is satisfied, the first wire layer 41 is formed by winding the wire on the upper surface of the step portion 32; if condition expression 2 and condition expression 3 are satisfied, the first wire layer 41 is formed without winding the wire on the upper surface 302 of the step portion 32.

More generally, when the first wire layer 41 and the second wire layer 42 are formed, the first wire layer 41 is formed by winding the wire on the upper surface 302 of the step portion 32 if, in a state in which the second wire layer 42 is formed on the first wire layer 41 wound to the end of the upper surface 302 of the step portion 32 on the inner side in the radial direction, ½ of the shortest distance between the second wire layers 42 on the insulators 30 mounted to teeth that are adjacent to each other in the circumferential direction among the plurality of teeth is greater than the diameter of the wire. On the other hand, the first wire layer 41 is formed without winding the wire on the upper surface 302 of the step portion 32 if, in a state in which the second wire layer 42 is formed on the first wire layer 41 wound to the end of the upper surface 302 of the step portion 32 on the inner side in the radial direction, ½ of the shortest distance between the second wire layers 42 on the insulators 30 mounted to teeth that are adjacent to each other in the circumferential direction among the plurality of teeth is smaller than the diameter of the wire, and if, in a state in which the second wire layer 42 is formed on the first wire layer 41 wound until the wire contacts the step surface 303 at the end of the step portion 32 on the outer side in the radial direction, ½ of the shortest distance between the second wire layers 42 on the insulators 30 mounted to teeth that are adjacent to each other in the circumferential direction among the plurality of teeth is greater than the diameter of the wire.

Whether, in the state in which the second wire layer 42 is formed on the first wire layer 41 wound to the end of the upper surface 302 of the step portion 32 on the inner side in the radial direction, ½ of the shortest distance between the second wire layers 42 on the insulators 30 mounted to teeth that are adjacent to each other in the circumferential direction among the plurality of teeth is greater than the diameter of the wire may be determined on the basis of, at least: the width of the insulator in a plane orthogonal to the axis direction; the diameter of the wire; the angle formed by central axes of teeth that are adjacent in the circumferential direction among the plurality of teeth; the distance from the central axis of the stator to the end of the upper surface 302 of the step portion 32 on the inner side in the radial direction; and the manner in which the first wire layer 41 and the second wire layer 42 are stacked. Further, whether, in a state in which the second wire layer 42 is formed on the first wire layer 41 wound to the end of the upper surface 302 of the step portion 32 on the inner side in the radial direction, ½ of the shortest distance between the second wire layers 42 on the insulators 30 mounted to teeth that are adjacent to each other in the circumferential direction among the plurality of teeth is smaller than the diameter of the wire, and whether, in a state in which the second wire layer 42 is formed on the first wire layer 41 wound until the wire contacts the step surface 303 at the end of the step portion 32 on the outer side in the radial direction, ½ of the shortest distance between the second wire layers 42 on the insulators 30 mounted to teeth that are adjacent to each other in the circumferential direction among the plurality of teeth is greater than the diameter of the wire may be determined, at least: the width of the insulator in a plane orthogonal to the axis direction; the diameter of the wire; the angle formed by central axes of teeth that are adjacent in the circumferential direction among the plurality of teeth; the distance from the central axis of the stator to the step surface 303 at the end of the step portion 32 on the outer side in the radial direction; and the manner in which the first wire layer 41 and the second wire layer 42 are stacked.

Figure 9:
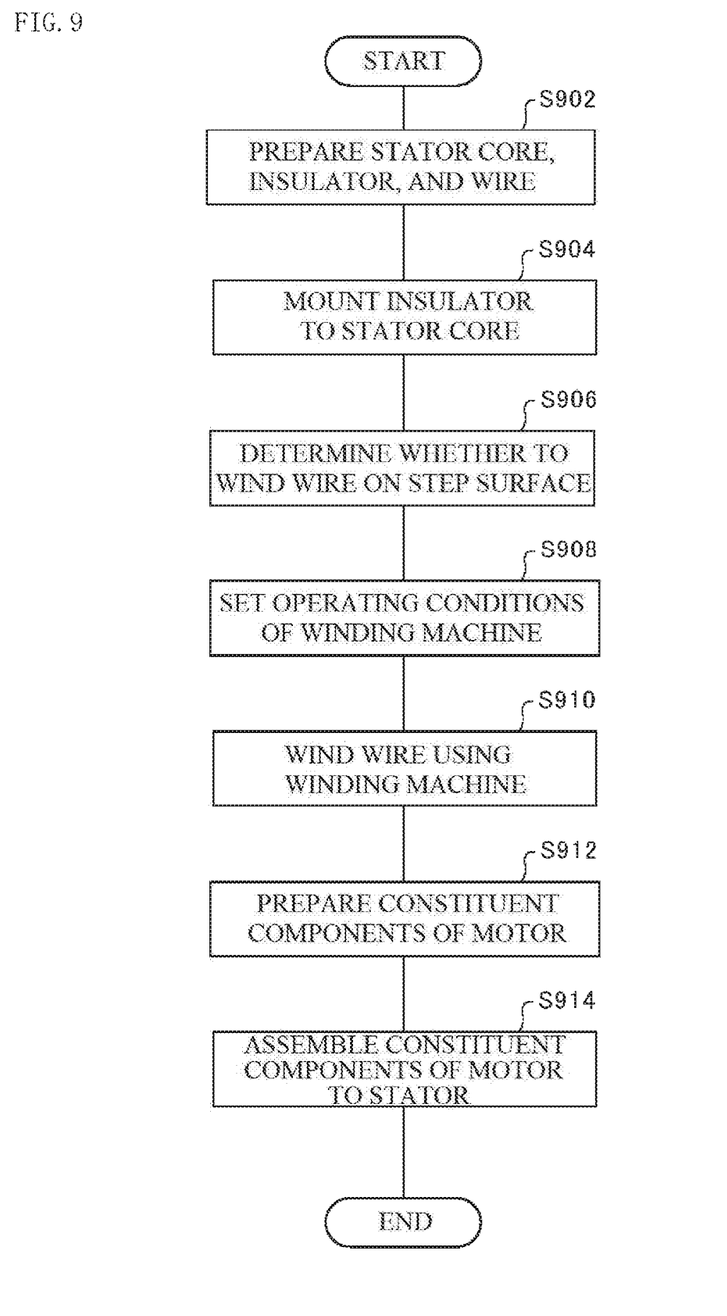
FIG. 9 is a flowchart illustrating steps of a motor manufacturing method.

FIG. 9 is a flowchart illustrating the steps of a motor manufacturing method.

In S902, the stator core, the insulator 30, and the wire are prepared. In S904, the insulator 30 is mounted to the stator core. In S906, it is determined whether the wire is to be wound on the upper surface 302 of the step portion 32. In S908, operating conditions for a winding machine are set on the basis of the determination in S906. In S910, the stator core with the insulator 30 mounted thereto is set in the winding machine. In S908, the wire is wound on the insulator 30 in accordance with the operating conditions that have been set, whereby the stator 10 is obtained.

In S912, constituent components of the motor are prepared. The constituent components of the motor may include a rotor, a bracket, and lead wires. In S914, the constituent components of the motor are assembled to the stator 10 manufactured in S910, whereby a motor is obtained.

As described above, the stator 10 includes the insulator 30 having the step portion 32, and whether, when a wire is wound on the step portion 32, the nozzle of the winding machine interferes with the winding can be appropriately determined in accordance with the wire diameter of the wire. Accordingly, it is possible to suppress the interference between the nozzle of the winding machine and the windings without preparing stators separately for wires with different diameters. When a wire with a small wire diameter is used, the wire is wound on the step portion 32, so that the number of turns can be maintained.

While the embodiments of the present invention have been described, the technical scope of the present invention is not limited to the scope of the embodiments. A person skilled in the art will readily appreciate that various modifications or improvements may be made to the embodiments. It will also be apparent from the claims that the embodiments with such modifications or improvements may be included in the technical scope of the present invention.

What is claimed is:

1. A method for manufacturing a stator comprising a stator core including a plurality of teeth arranged in a circumferential direction and extending inward in a radial direction, and a wire wound on an insulator mounted to the plurality of teeth, the insulator including, on a winding surface thereof on which the wire is wound and at a distal end in the direction of extension of the plurality of teeth, a step portion protruding in an axis direction of the stator, the method comprising a step of forming a first wire layer wound on the insulator and a second wire layer wound on the first wire layer by winding the wire on the insulator, wherein the step of forming the first wire layer and the second wire layer includes:

if $(L1+D)\tan(\theta/2) \times \cos(\theta/2) - A\cos(\theta/2) > D$, forming the first wire layer by winding the wire on an upper surface of the step portion; and if $(L1+D)\tan(\theta/2) \times \cos(\theta/2) - A\cos(\theta/2) < D$ and $(L2+D)\tan(\theta/2) \times \cos(\theta/2) - A\cos(\theta/2) > D$, forming the first wire layer without winding the wire on the upper surface of the step portion, where:

A is $B/2 + (1+\sqrt{3}/2)D$;

B is a width of the insulator in a plane orthogonal to the axis direction;

D is a diameter of the wire;

θ is an angle formed by central axes of teeth that are adjacent in the circumferential direction among the plurality of teeth;

L1 is a distance from a central axis of the stator to an end of the upper surface of the step portion on the inner side in the radial direction; and L2 is a distance from the central axis of the stator to an end of the upper surface of the step portion on the outer side in the radial direction.

2. The manufacturing method according to claim 1, wherein the insulator includes the step portion only on an end surface that intersects the axis direction, among a plurality of end surfaces of the insulator.

3. The manufacturing method according to claim 1, wherein $D/2 \le H$ where H is a height of the step portion.

4. The manufacturing method according to claim 1, wherein the insulator does not include, on the winding surface and at an end on the opposite side from the distal end in the direction of extension of the teeth, a step portion protruding in the axis direction of the stator.

5. A stator comprising:

a stator core including a plurality of teeth arranged in a circumferential direction and extending inward in a radial direction;

an insulator mounted to the plurality of teeth;

a first wire layer of a wire wound on the insulator; and a second wire layer of the wire wound on the first wire layer, wherein the insulator includes, on a winding surface thereof on which the wire is wound and at a distal end in the direction of extension of the plurality of teeth, a step portion protruding in an axis direction of the stator, the first wire layer is formed of the wire wound on the winding surface including an upper surface of the step portion, and $(L1+D)\tan(\theta/2) \times \cos(\theta/2) - A\cos(\theta/2) > D$ is satisfied, where:

A is $B/2 + (1+\sqrt{3}/2)D$;

B is a width of the insulator in a plane orthogonal to the axis direction;

D is a diameter of the wire;

θ is an angle formed by central axes of teeth that are adjacent in the circumferential direction among the plurality of teeth;

L1 is a distance from a central axis of the stator to an end of the upper surface of the step portion on the inner side in the radial direction; and L2 is a distance from the central axis of the stator to an end of the upper surface of the step portion on the outer side in the radial direction.

6. The stator according to claim 5, wherein $D/2 \le H$ where H is a height of the step portion.

7. The stator according to claim 6, wherein the insulator does not include, on the winding surface and at an end on the opposite side from the distal end in the direction of extension of the teeth, a step portion protruding in the axis direction of the stator.

8. The stator according to claim 5, wherein the insulator does not include, on the winding surface and at an end on the opposite side from the distal end in the direction of extension of the teeth, a step portion protruding in the axis direction of the stator.

9. A motor comprising the stator according to claim 5.

10. A stator comprising:

a stator core including a plurality of teeth arranged in a circumferential direction and extending inward in a radial direction;

an insulator mounted to the plurality of teeth;

a first wire layer of a wire wound on the insulator; and a second wire layer of the wire wound on the first wire layer, wherein the insulator includes, on a winding surface thereof on which the wire is wound and at a distal end in the direction of extension of the plurality of teeth, a step portion protruding in an axis direction of the stator, the first wire layer is formed on the winding surface except for an upper surface of the step portion, and $(L1+D)\tan(\theta/2) \times \cos(\theta/2) - A\cos(\theta/2) < D$ and $(L2+D)\tan(\theta/2) \times \cos(\theta/2) - A\cos(\theta/2) > D$ are satisfied, where:

A is $B/2 + (1+\sqrt{3}/2)D$;

B is a width of the insulator in a plane orthogonal to the axis direction;

D is a diameter of the wire;

θ is an angle formed by central axes of teeth that are adjacent in the circumferential direction among the plurality of teeth;

L1 is a distance from a central axis of the stator to an end of the upper surface of the step portion on the inner side in the radial direction; and L2 is a distance from the central axis of the stator to an end of the upper surface of the step portion on the outer side in the radial direction.

11. The stator according to claim 10, wherein $D/2 \leq H$ where H is a height of the step portion.

12. The stator according to claim 11, wherein the insulator does not include, on the winding surface and at an end on the opposite side from the distal end in the direction of extension of the teeth, a step portion protruding in the axis direction of the stator.

13. The stator according to claim 10, wherein the insulator does not include, on the winding surface and at an end on the opposite side from the distal end in the direction of extension of the teeth, a step portion protruding in the axis direction of the stator.

14. A motor comprising the stator according to claim 10.

* * * * *